L. A. PADDOCK.
Improvement in Horse Hay Rakes.
No. 125,216.
Patented April 2, 1872.
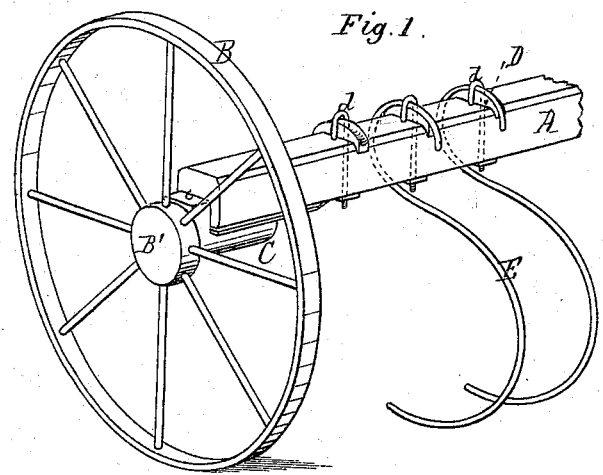
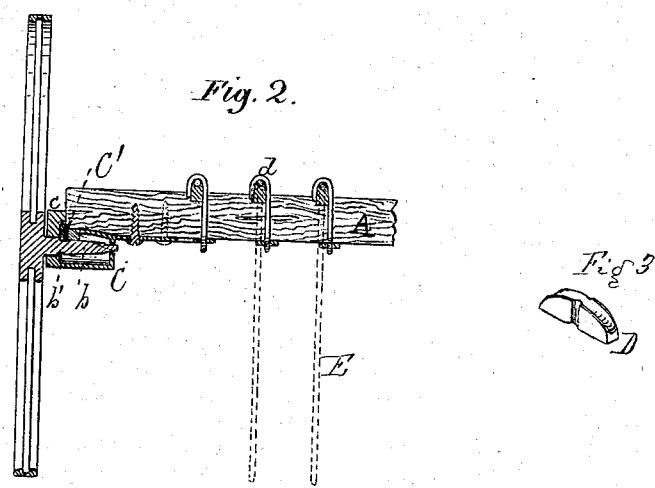
Witnesses
Alex. Mahon
H. H. Doubleday
Inventor.
Linus A. Paddock
by his Attorney
A. M. Smith 125,216

UNITED STATES PATENT OFFICE.

LINUS A. PADDOCK, OF PECATONICA, ILLINOIS.

IMPROVEMENT IN HORSE HAY-RAKES.

Specification forming part of Letters Patent No. 125,216, dated April 2, 1872.

*To all whom it may concern:*

Be it known that I, LINUS A. PADDOCK, of Pecatonica, county of Winnebago and State of Illinois, have invented certain new and useful Improvements in Horse-Rakes, of which the following is a full, clear, and exact description, reference being had to the accompanying drawing making part of this specification, in which—

Figure 1 is a perspective view of so much of a horse-rake as is necessary to illustrate my invention, and Fig 2 is a longitudinal vertical section. Fig. 3 is a detached view of a saddle or carrier employed for mounting the rake-teeth.

Similar letters of reference denote corresponding parts in all figures.

A serious defect in the devices usually employed for securing the wire teeth to the head in a horse-rake, arises from the difficulty experienced in properly adjusting them. Thus, as the rake is used, the teeth will become bent by catching upon obstructions, or from the weight of the hay which they gather, and the amount of "set" which is given them will vary, because of the difference in the quality and temper in the wire of which they are made, so that their points will not rest upon the ground in the same line. In order to remedy these defects and to provide a convenient means, whereby they can be easily brought back into line, I have invented this device.

In the drawing, A is the axle; B B', the wheel; and C, and axle socket, securing the wheel to the axle, but any other desired or usual construction of wheel and axle may be substituted for that shown in the drawing. D is a tooth-saddle. The upper side of this saddle forms a segment of a circle of a diameter equal to the convolutions of the spring-tooth E, and is grooved so as to form a seat in which it (the tooth) shall fit closely. The lower face of this saddle corresponds to the surface of the axle to which it is to be applied, and is by preference seated in gains cut in said axle. The saddle may be provided with spurs on its lower face, which shall take into the axle to hold it in place. *d* is a clamping-hook, the longer arm of which passes through the axle, when it is secured by a screw-nut. The hook is just large enough to admit the tooth, and the saddle has perpendicular grooves upon each side (see Fig. 3) to receive the shanks or arms of said hook, so that they may fit the tooth and confine it firmly to the saddle. Any desired number of coils or convolutions in the fixed end of the tooth may be used instead of the single one shown. By the use of these fastening devices, the teeth can be easily adjusted by slipping them around in the saddle, loosening the hooks for that purpose. Of course, the main axle A can be made to rock by any of the well-known systems of levers in common use for that purpose.

I do not claim broadly the use of a metallic seat for mounting the teeth upon an axle, nor the employment of screw eyes or hooks for clamping the teeth to the rake-head or axle, as both of these features are old. But my saddle has some advantages over any fastening with which I am acquainted, as the teeth are confined closely between two metallic surfaces and can be held very securely; they can be adjusted about the axle to compensate for any amount of "set" which they may receive; they can be readily applied to any shape or size of rake-head, and permit the teeth to be readily removed and replaced without removing the head or axle from position.

Having now described my invention, what I claim as new, and desire to secure by Letters Patent, is—

In combination with axle or rake-head and the tooth of a hay-rake, the saddle D, and fastening devices for securing the tooth to the axle or head, substantially as described.

This specification signed and witnessed this 27th day of October, 1871.

LINUS A. PADDOCK.

Witnesses:
G. W. FORD,
B. S. SANBORN.